United States Patent Office 3,654,243
Patented Apr. 4, 1972

3,654,243
VULCANIZATION OF UNSATURATED
ETHYLENE-α-OLEFIN RUBBERS
Harald Blümel, Marl, Germany, assignor to Chemische
Werke Huls A.G., Marl, Germany
No Drawing. Filed Oct. 13, 1965, Ser. No. 495,695
Claims priority, application Germany, Oct. 16, 1964,
C 34,115
Int. Cl. C08f 27/06
U.S. Cl. 260—79.5 B                                    21 Claims

ABSTRACT OF THE DISCLOSURE

Vulcanized unsaturated ethylene-propylene rubbers having improved resistances to tear and crack growth are produced by the use of a vulcanization system comprising thiuram accelerators and/or dithiocarbamate accelerators, together with an amine of the formula:

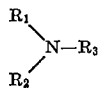

wherein
$R_1$ is an alkyl, hydroxyalkyl, alkyloxyalkyl, or alkenyloxyalkyl residue;
$R_2$ is H, or a cycloalkyl residue; and
$R_3$ is H, or an alkyl, hydroxyalkyl, alkyloxyalkyl, or alkenyloxyalkyl residue.
This system also results in a substantially increased vulcanization velocity, as compared to prior art systems.

This invention relates broadly to a vulcanizable composition and more particularly to a mixture of vulcanization accelerators and promoters for unsaturated α-olefin rubber.

It is known that vulcanized products composed of unsaturated ethylene-α-olefin rubbers possess good mechanical properties because of their relatively low degree of unsaturation, and are also highly resistant to aging caused by light, oxygen, and heat. However, there are also disadvantages attendant the use of products having a low degree of unsaturation, such as the slow rate at which they vulcanize in comparison to the vulcanization rate of the highly unsaturated rubber types, such as, for example, natural rubber, butadiene-acrylonitrile rubber, polybutadiene rubber, butadiene-styrene rubber, and polychloroprene rubber.

Therefore, it was heretofore necessary to vulcanize rubber mixtures containing unsaturated ethylene-α-olefin rubber with so-called ultra-accelerators which are principally thiuram and dithiocarbamate compounds and mixtures thereof. (These ultra-accelerators are employed with highly unsaturated rubbers in only special cases since they introduce unpredictable parameters into the vulcanization process, such as scorching.)

The aforementioned rubber mixtures optionally contained fillers, plasticizers, stabilizers, vulcanization promoters, accelerators, and other substances conventionally incorporated into rubber mixtures. With respect to certain amine additives, in particular, such as hexamethylene tetramine, diphenyl guanidine, and diorthotolyl guanidine, though, they have been widely used in accelerators or accelerator-activators in admixtures with the highly unsaturated rubbers. When these amines, commonly used for highly unsaturated polymers, are used solely in unsaturated ethylene-α-olefin rubber, the rate of vulcanization and the properties of the vulcanized product are very unsatisfactory. Even when they are used together with other accelerators in unsaturated ethylene-α-olefin rubber, the vulcanization process will be retarded.

With the vulcanization systems described hereinbefore it was not possible to attain economically attractive rates of vulcanizing ethylene-α-olefin rubber mixtures, i.e., vulcanization periods during which 90% of the maximally achievable modulus value are obtained, particularly when using lower and moderate vulcanization temperatures. The absolute modulus values of the rubber obtainable under these conditions are also too high for many applications, this being especially true in case of ethylene-α-olefin rubbers containing dicyclopentadiene as the unsaturated component. Furthermore, the tear resistance and concomitant dynamic resistance to crack growth upon flexure are often lower than those of other synthetic rubbers.

It is therefore a principal object of the invention to provide an improved composition which will accelerate the vulcanization of unsaturated ethylene-α-olefin rubber.

It is another object of this invention to provide a vulcanization process which will aid in the production of an ethylene-α-olefin rubber having improved properties.

It is still another object of the invention to provide ethylene-α-olefin rubbers having improved properties.

These and other objects, aspects and advantages of the invention will be apparent from the following description and appended claims.

It was discovered that unsaturated ethylene-α-olefin rubber can be substantially more rapidly vulcanized, with a simultaneous improvement in the tear resistance and the resistance to crack growth upon flexure of the vulcanized products, when a vulcanization system of the present invention is utilized. It was surprisingly discovered that the method of vulcanizing these rubbers and the resulting rubber is improved by employing as vulcanizing ingredients based on the weight of the terpolymer 0.25 to 5.0% by weight, preferably 1.0 to 2.0% by weight of a thiuram or dithiocarbamate ultra-accelerator; 0.25 to 3.5% by weight, preferably 0.75 to 1.5% by weight of sulfur; and 0.15 to 5.0% by weight, preferably 1.0 to 2.0% by weight, of one or several amines of the general formula

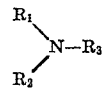

wherein $R_1$ represents alkyl preferably having 1 to 20, more preferably 1 to 16 carbon atoms; hydroxyalkyl preferably having 1 to 5, more preferably 1 to 2 hydroxy radicals attached to an alkyl radical preferably having 1 to 20, more preferably 1 to 16 carbon atoms, the ratio of hydroxy radicals to carbon atoms being preferably 0.1 to 1 more preferably 0.5 to 1, and with the positioning of the hydroxy radicals in the alkyl radical being preferably ω alkyloxyalkyl wherein the alkyl preferably contains 1 to 20, more preferably 1 to 16 carbon atoms;

alkenyloxyalkyl having preferably 1 to 20, more preferably 1 to 16 carbon atoms, and preferably 1 to 3, more preferably one double bond, the double bond being preferably positioned with respect to the oxy atom at ω or amino alkyl having preferably 1 to 20, more preferably 1 to 16 carbon atoms, and preferably 1 to 5, more preferably 1 to 2 amino radicals positioned preferably ω, resp. α, β, γ . . . ω.

$R_2$ is H, or a cycloalkyl residue having preferably 5 to 20, more preferably 5 to 10 carbon atoms and preferably 1 to 2 rings;

$R_3$ is H or $R_1$ as previously defined.

Amines embraced within the above structural formula and preferred for use in this invention are, for example, (a) cyclohexyl amine, (b) aminopropyl alcohol, (c) 1-aminopropanol-2, (d) n-butyl amine, (e) stearyl amine, (f) lauryl amine, (g) di-3-aminopropyl ether, (h) 3-lauryloxy propyl amine, (i) 3-allyloxy-2-oxypropyl amine-1, (j) polyethylene polyamine, (k) N,N-diethylaminopropylamine, (l) N,N-diethylethylene diamine, (m) [di-(2-oxypropyl)]-ethanolamine, (n) N-(n-butyl)-diethanolamine, (o) cyclohexylethylamine, (p) 3-butoxypropylamine, (q) N,N-dibutylaminopropylamine, (r) N,N-dimethylaminopropylamine, (s) (2,2'-dioxy - 3,3' - diallyloxy)-dipropylamine.

It is to be understood that "ethylene-α-olefin rubber" means copolymers formed using a Ziegler-type catalyst system or an equivalent thereof with 10 to 90, preferably 20 to 60 mol percent ethylene, and
10 to 80, preferably 40 to 70 mol percent another α-monoolefin having 3 to 8, and preferably 3 to 4 carbon atoms and in particular propylene, or α-butylene.

0.1 to 20, preferably to 10 weight percent, based on the total terpolymer of at least one additional, polymerizable polyunsaturated compound, being preferably hydrocarbon, advantageously of 4 to 30, more preferably 4 to 20 carbon atoms and 2 to 5, preferably 2 to 3 double bonds per monomer, such as, for example, dicyclopentadiene, hexadiene-1,4, decatriene-1,4,9, cyclooctadiene-1,5, norbornene, as well as its alkenyl derivatives or suitable addition products of polyunsaturated compounds as 5-methylene norbornene, butenyl norbornene.

The thiuram or dithiocarbamate accelerator can be, for example, (a) tetramethyl thiuram disulfide, (b) tetramethyl thiuram monosulfide, (c) zinc-N-diethyl dithiocarbamate, (d) zinc-N-dibutyldithiocarbamate, (e) N-cyclohexyl - ethylammonium-N-cyclohexylethyldithiocarbamate, (f) zinc-N-dimethyl dithiocarbamate, (g) zinc-N-ethylphenyldithiocarbamate, (h) zinc-N-pentamethylendithiocarbamate, (i) dimethyldiphenylthiuramdisulfide, or (j) dipentamethylene thiuram tetrasulfide.

The amines to be utilized herein can be added to the rubber hydrocarbon, alone or together with another component of the mixture. The amines can be added, for example, during the process of forming the polymer; while the polymer is being worked up; in a separate process step before the mixture is produced; or only after other components of the composition have been admixed. The subsequent vulcanization is conducted in a conventional manner in a vulcanization equipment normally used, e.g. mold or press. However, it is also possible to utilize special vulcanization methods, such as hot-air vulcanization, continuous vulcanization (CV vulcanization), or vulcanization by the injection molding process, and other related methods. The vulcanization is preferably carried out at 140 to 220° C., more preferably 150 to 180° C.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

In Table I, a conventional vulcanizable composition A for ethylene-α-olefin rubber is compared with a vulcanizable composition B which represents a preferred embodiment of the present invention. In Table 2 composition A is utilized in runs I, III, and V, and composition B in runs II, IV, and VI. For each of the runs tabulated in Table 2, an ethylene-propylene rubber having dicyclopentadiene as the unsaturated component, a content of propylene of about 45 molar percent, and a Mooney plasticity of ML4=ca. 45 is utilized. In runs I and II, a rubber having a lower degree of unsaturation is employed; in runs III and IV a rubber of medium unsaturation is used, and runs V and VI use a rubber of higher unsaturation.

The runs utilizing composition A characterizing the state of the art, are shown in Table 2. These results also show that there is no substantial increase in the vulcanization rate when the dicyclopentadiene content of the ethylene-propylene rubber is increased from about 5% by weight, as in run III, to about 9% by weight, as in run V. This can be easily recognized graphically if desired, by plotting the modulus percentages at the bottom of Table 2 against the dicyclopentadiene content tabulated in the second column.

The modulus percent is a measure of the vulcanization velocity, since the degree of vulcanization at the end of a predetermined uniform vulcanization period is represented as a percentage of the vulcanization maximally obtainable for the mixture in question. The compositions used in runs I, III and V exhibit different absolute values of moduli (300% elongation) owing to differing degrees of vulcanization corresponding to the specific degree of unsaturation of the rubber used therein.

Runs II, IV and VI were made using composition B with differing quantities of dicyclopentadiene. Although composition B vulcanizes markedly faster than composition A, the formation of "plateaus" commences earlier and the rate of vulcanization is greatest in the rubber having the least degree of unsaturation (i.e. least amount of dicyclopentadiene.). Thus a comparison of the modulus percent for runs I and II clearly illustrates the effect of the vulcanization promoters of this invention on rubbery compositions having a low degree of unsaturation. In addition to the effect accompanying the use of rubbers having a low degree of unsaturation, it is also apparent in runs II, IV, and VI that there is also observed in these compositions containing the amines of this invention a general decrease in the moduli and an increase in the elongation. There is also observed a marked improvement in the tear resistance and an increase in the resistance to crack growth upon flexing which, in some instances, can amount to more than 50%.

It is thus of particular interest that advantageous properties can be obtained from compositions vulcanized in accordance with this invention with a lower degree of vulcanization on the one hand, and an increased rate of vulcanization on the other. Furthermore, by the use of the amine additive of the invention, there are no substantial differences in the vulcanization rate of rubbers having a lower degree of unsaturation and those having a higher degree of unsaturation. The practical significance of the foregoing discovery resides in that, for one, the rubbers having a lower degree of unsaturation, can be produced more easily and economically, and owing to improved properties, better aging characteristics, are useful in an enlarged field of application. Another benefit of the present process is that polyunsaturated components which were formerly undesirable because of their slow vulcanization rate can be used in unsaturated ethylene-propylene rubbers to produce rubbery materials having superior properties. Thus, the present vulcanization process now makes available a class of rubbers having various tercomponents which heretofore were of only minor practical importance because of their low vulcanization rate.

By the selection of the amount of amine and the amount of the other vulcanizing agents within the disclosed ranges, the vulcanization velocity can be adjusted to ranges suitable for specific purposes. That is, the properties of the vulcanized product, such as modulus, tear resistance, elongation, can be tailored for specific uses as can be seen from Example 2.

EXAMPLE 2

In Table 3 there are shown five different compositions of which C is an example of the conventionally utilized vulcanization compositions, while D, E, F and G are variants of the present compositions. The results of vulcanization runs made with these various compositions are shown tabulated in Table 4. In addition to the markedly increased vulcanization rate and improved properties of the resulting rubber, it is now possible to vary the modulus and/or the degree of vulcanization to suit a particular need. This flexibility in processing conditions is illustrated in compositions D via E and F to G by the use of differing quantities of vulcanization agent within wide limits, while simultaneously mantaining the increase in the vulcanization rate, or faster formation of plateaus.

Furthermore, changes in the composition of the basic mixture, i.e., of the components of the rubber mixture not necessary for the vulcanization proper, can also be employed to vary the properties of the vulcanized product correspondingly, again with the high vulcanization rates being maintained. Such effects are exemplified in the following example.

EXAMPLE 3

The decrease in modulus accompanying the use of the described method for increasing the vulcanization velocity is often undesirable. However, this concomitant tendency toward a reduced modulus can be completely or partially reversed by varying the composition of the basic rubber mixture, the quantity of vulcanization agents being kept constant. In the example, a comparatively higher modulus is obtained by omitting the plasticizer component from the basic rubber mixture.

Table 5 shows the various compositions used to illustrate this effect: H is a composition which is conventionally used: J is a composition according to the method of the invention: and K is a composition as in J, but without the plasticizer.

Table 6 shows that the vulcanization velocity as expressed by the modulus percentage, increased substantially equally in J and K as compared to H, but the absolute value of the modulus is much higher (~80) in the case of K than in J (~50).

The invention is described in Examples 1 to 3 in conjunction with the use of cyclohexylethyl amine. The following examples show that the same or similar effects can also be achieved with other amines embraced by the above generic structural formula. In all of the following examples, an unsaturated ethylene-propylene rubber (45% mol percent propylene) is used which contains dicyclopentadiene as the unsaturated component in a quantity of about 5% by weight and has a plasticity of ML-4=about 45.

EXAMPLE 4

The vulcanization rates, expressed as modulus percent, in Table 8 are based on vulcanizing the ethylenepropylene rubber composition of Table 7 wherein the amine is N,N-diethylamino propyl amine.

EXAMPLE 5

The vulcanization rates, expressed as modulus percent, in Table 9 are based on vulcanizing the ethylenepropylene rubber composition of Table 7 wherein the amine is 3-allyloxy-2-oxypropyl amine.

EXAMPLE 6

The vulcanization rates, expressed as modulus percent in Table 10 are based on vulcanizing the ethylenepropylene rubber composition of Table 7 wherein the amine is [di-(2-oxypropyl]-ethanolamine.

EXAMPLE 7

The vulcanization rates, expressed as modulus percent in Table 11 are based on vulcanizing the ethylenepropylene rubber composition of Table 7 wherein the amine is di-3-aminopropyl ether.

The preceding examples clearly show that this invention is broad with respect to the types of amines capable of increasing the rate of vulcanization.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

TABLE 1.—RECIPES

|  | A | B |
|---|---|---|
| Ethylene-α-olefin rubber, unsaturated | 100 | 100 |
| Stearic acid | 1 | 1 |
| ZnO | 5 | 5 |
| HAF carbon black (high abrasion furnace=HAF) | 50 | 50 |
| Naphthenic plasticizing oil | 10 | 10 |
| Tetramethyl thiuram disulfide | 1.5 | 2.0 |
| Mercaptobenzothiazole | 0.75 |  |
| Cyclohexyl ethylamine |  | 1.0 |
| Sulfur | 1.5 | 1.0 |

TABLE 2

| Mixture | Unsaturated ethylene-propylene rubber ML-4= ca. 45 | Defo-plasticity [2] | Mooney viscosity of mixture ML-4 | Vulcanizing period in minutes at 160° C. | Tensile strength (kg./cm.²) | Elongation (percent) | Modulus (300%) (kg./cm.²) | Tear resistance (kg. absolute) | Hardness (° shore) | Elasticity (22° C.) |
|---|---|---|---|---|---|---|---|---|---|---|
| I(A) | Wt.-percent DCP,[1] ca. 2.5 | 1,750/24 | 70 | 15 | 124 | 715 | 41 | 14 | 60 | 45 |
|  |  |  |  | 30 | 192 | 605 | 70 | 17 | 65 | 45 |
|  |  |  |  | 60 | 213 | 520 | 94 | 12 | 65 | 45 |
|  |  |  |  | 120 | 217 | 495 | 104 | 11 | 66 | 47 |
| II(B) | Wt.-percent DCP,[1] ca. 2.5 | 1,750/28 | 70 | 15 | 101 | 675 | 36 | 12 | 59 | 43 |
|  |  |  |  | 30 | 139 | 590 | 54 | 15 | 60 | 43 |
|  |  |  |  | 60 | 136 | 570 | 52 | 16 | 60 | 45 |
|  |  |  |  | 120 | 121 | 540 | 50 | 13 | 60 | 45 |
| III(A) | Wt.-percent DCP, ca. 5 | 1,400/20 | 62 | 15 | 198 | 635 | 72 | 16 | 65 | 43 |
|  |  |  |  | 30 | 208 | 475 | 113 | 12 | 69 | 45 |
|  |  |  |  | 60 | 199 | 400 | 135 | 10 | 70 | 45 |
|  |  |  |  | 120 | 200 | 395 | 141 | 10 | 70 | 45 |
| IV(B) | Wt.-percent DCP, ca. 5 | 1,400/22 | 61 | 15 | 175 | 635 | 58 | 17 | 61 | 43 |
|  |  |  |  | 30 | 183 | 570 | 69 | 15 | 63 | 43 |
|  |  |  |  | 60 | 174 | 550 | 72 | 15 | 64 | 43 |
|  |  |  |  | 120 | 152 | 520 | 74 | 14 | 64 | 43 |
| V(A) | Wt.-percent DCP, ca. 9 | 1,550/23 | 59 | 15 | 212 | 490 | 105 | 13 | 65 | 43 |
|  |  |  |  | 30 | 192 | 380 | 156 | 10 | 70 | 45 |
|  |  |  |  | 60 | 202 | 335 | 173 | 9 | 70 | 45 |
|  |  |  |  | 120 | 198 | 305 | 184 | 9 | 70 | 45 |
| VI(B) | Wt.-percent DCP, ca. 9 | 1,450/27 | 58 | 15 | 205 | 555 | 80 | 15 | 64 | 42 |
|  |  |  |  | 30 | 201 | 490 | 97 | 14 | 64 | 43 |
|  |  |  |  | 60 | 197 | 475 | 104 | 13 | 65 | 43 |
|  |  |  |  | 120 | 190 | 450 | 107 | 13 | 65 | 43 |

[1] Dicyclopentadiene. Magnitude of modulus of the vulcanization stage of 30 minutes, expressed in percent of the maximum modulus at a 300% elongation: I, 67.5; II, 100; III, 80; IV, 93.5; V, 85; VI, 90.5.
[2] According to DIN 53 514.

TABLE 3.—RECIPE

|  | C | D | E | F | G |
|---|---|---|---|---|---|
| Ethylene-propylene rubber, unsaturation corresponding to mixture III or IV of Table 2, ML-4=about 45 | 100 | 100 | 100 | 100 | 100 |
| Stearic acid | 1 | 1 | 1 | 1 | 1 |
| ZnO | 5 | 5 | 5 | 5 | 5 |
| HAF carbon black | 50 | 50 | 50 | 50 | 50 |
| Naphthenic plasticizer oil | 10 | 10 | 10 | 10 | 10 |
| Tetramethylthiuram disulfide | 1.5 | 2 | 2 | 2 | 2 |
| Mercaptobenzothiazole | 0.75 |  |  |  |  |
| Cyclohexyl ethylamine |  | 0.5 | 1 | 1.5 | 1.5 |
| Sulfur | 1.5 | 0.5 | 1 | 1.5 | 2.0 |

TABLE 7.—RECIPE

|  | L |
|---|---|
| Ethylene-propylene rubber unsaturation corresponding to mixture III or IV of Table 2, ML-4=about 45 | 100 |
| Stearic acid | 1 |
| ZnO | 5 |
| HAF carbon black | 50 |
| Naphthenic plasticizer oil | 10 |
| Tetramethyl thiuram disulfide | 2.0 |
| Mercaptobenzothiazole |  |
| $\mathrm{N} \begin{array}{l} \diagup R_1 \\ - R_2 \\ \diagdown R_3 \end{array}$ | 1.0 |
| Sulfur | 1.0 |

TABLE 4

| Mixture | Vulcanizing period in minutes at 160° C. | Tensile strength (kg./cm.²) | Elongation (percent) | Modulus (300%) (kg./cm.²) | Tear resistance (kg. absolute) | Hardness (° Shore) | Elasticity (22° C.) (percent) | Modulus percentages [1] |
|---|---|---|---|---|---|---|---|---|
| C | 15 | 195 | 565 | 70 | 17 | 64 | 43 | 76 |
|  | 30 | 222 | 495 | 116 | 14 | 66 | 45 |  |
|  | 60 | 219 | 420 | 145 | 11 | 70 | 46 |  |
|  | 120 | 227 | 410 | 152 | 10 | 70 | 48 |  |
| D | 15 | 128 | 675 | 40 | 15 | 60 | 44 | 94 |
|  | 30 | 131 | 620 | 45 | 15 | 60 | 45 |  |
|  | 60 | 118 | 580 | 49 | 14 | 60 | 45 |  |
|  | 120 | 111 | 535 | 48 | 13 | 60 | 45 |  |
| E | 15 | 173 | 630 | 64 | 17 | 61 | 45 | 96 |
|  | 30 | 182 | 550 | 78 | 14 | 65 | 45 |  |
|  | 60 | 182 | 535 | 82 | 15 | 65 | 45 |  |
|  | 120 | 168 | 510 | 81 | 16 | 64 | 45 |  |
| F | 15 | 187 | 620 | 71 | 19 | 64 | 45 | 93 |
|  | 30 | 193 | 510 | 97 | 17 | 65 | 45 |  |
|  | 60 | 192 | 485 | 101 | 14 | 65 | 45 |  |
|  | 120 | 185 | 460 | 104 | 14 | 65 | 45 |  |
| G | 15 | 200 | 585 | 81 | 17 | 65 | 45 | 65 |
|  | 30 | 197 | 450 | 117 | 11 | 69 | 45 |  |
|  | 60 | 192 | 400 | 132 | 10 | 69 | 45 |  |
|  | 120 | 193 | 400 | 138 | 11 | 69 | 45 |  |

[1] Magnitude of modulus of the vulcanization stage of 30 minutes, expressed in percent of the maximum modulus at a 300% elongation.

TABLE 5.—RECIPES

|  | H | J | K |
|---|---|---|---|
| Ethylene-propylene rubber, unsaturation corresponding to mixture I or II of Table 2, ML-4=about 45 | 100 | 100 | 100 |
| Stearic acid | 1 | 1 | 1 |
| ZnO | 5 | 5 | 5 |
| HAF carbon black | 50 | 50 | 50 |
| Naphthenic plasticizer | 10 | 10 |  |
| Tetramethyl thiuram disulfide | 1.5 | 2 | 2 |
| Mercaptobenzothiazole | 0.75 |  |  |
| Cyclohexyl ethylamine |  | 1 | 1 |
| Sulfur | 1.5 | 1 | 1 |

TABLE 6

| Mixure | Vulcanizing period in minutes at 160° C. | Tensile strength (kg./cm.²) | Elongation (percent) | Modulus (300%) (kg./cm.²) | Tear resistance (kg. absolute) | Hardness (° Shore) | Elasticity (22° C.) (percent) | Modulus percentages [1] |
|---|---|---|---|---|---|---|---|---|
| H | 15 | 124 | 715 | 41 | 14 | 60 | 45 | 67.5 |
|  | 30 | 192 | 605 | 70 | 17 | 65 | 45 |  |
|  | 60 | 213 | 520 | 94 | 12 | 65 | 45 |  |
|  | 120 | 217 | 495 | 104 | 11 | 66 | 47 |  |
| J | 15 | 101 | 675 | 36 | 12 | 59 | 43 | 100 |
|  | 30 | 139 | 590 | 54 | 15 | 60 | 43 |  |
|  | 60 | 136 | 570 | 52 | 16 | 60 | 45 |  |
|  | 120 | 121 | 540 | 50 | 13 | 60 | 45 |  |
| K | 15 | 116 | 545 | 55 | 16 | 64 | 45 | 100 |
|  | 30 | 161 | 505 | 79 | 19 | 65 | 45 |  |
|  | 60 | 160 | 485 | 81 | 18 | 65 | 45 |  |
|  | 120 | 136 | 450 | 79 | 17 | 65 | 45 |  |

[1] Magnitude of modulus of the vulcanization stage of 30 minutes, expressed in percent of the maximum modulus at a 300% elongation.

TABLE 8

| Mixture with— | Vulcanizing period in minutes at 160° C. | Tensile strength (kg./cm.²) | Elongation (percent) | Modulus (300%) (kg./cm.²) | Tear resistance (kg. absolute) | Hardness (° Shore) | Elasticity (22° C.) (percent) | Modulus percentages [1] |
|---|---|---|---|---|---|---|---|---|
| N,N-diethylaminopropylamine | 15 | 127 | 645 | 48 | 14 | 61 | 41 | 93 |
|  | 30 | 189 | 595 | 72 | 16 | 65 | 43 |  |
|  | 60 | 194 | 570 | 78 | 14 | 65 | 43 |  |
|  | 120 | 182 | 550 | 77 | 14 | 65 | 43 |  |

See footnote at end of Table 11.

TABLE 9

| Mixture with— | Vulcanizing period in minutes at 160° C. | Tensile strength (kg./cm.²) | Elongation (percent) | Modulus (300%) (kg./cm.²) | Tear resistance (kg. absolute) | Hardness (° Shore) | Elasticity (22° C.) (percent) | Modulus percentages [1] |
|---|---|---|---|---|---|---|---|---|
| 3-allyloxy-2-oxypropylamine | 15 | 106 | 610 | 48 | 11 | 65 | 42 | 89 |
|  | 30 | 161 | 580 | 64 | 12 | 65 | 43 |  |
|  | 60 | 145 | 545 | 68 | 12 | 65 | 43 |  |
|  | 120 | 189 | 595 | 72 | 12 | 65 | 43 |  |

See footnote at end of Table 11.

TABLE 10

| Mixture with— | Vulcanizing period in minutes at 160° C. | Tensile strength (kg./cm.²) | Elongation (percent) | Modulus (300%) (kg./cm.²) | Tear resistance (kg. absolute) | Hardness (° Shore) | Elasticity (22° C.) (percent) | Modulus percentages [1] |
|---|---|---|---|---|---|---|---|---|
| [Di-(2-oxypropyl] ethanolamine | 15 | 208 | 605 | 80 | 14 | 65 | 42 | 92 |
|  | 30 | 207 | 470 | 115 | 10 | 67 | 43 |  |
|  | 60 | 212 | 475 | 121 | 11 | 69 | 43 |  |
|  | 120 | 205 | 455 | 125 | 11 | 69 | 43 |  |

See footnote at end of Table 11.

TABLE 11

| Mixture with— | Vulcanizing period in minutes at 160° C. | Tensile strength (kg./cm.²) | Elongation (percent) | Modulus (300%) (kg./cm.²) | Tear resistance (kg. absolute) | Hardness (° Shore) | Elasticity (22° C.) (percent) | Modulus percentages [1] |
|---|---|---|---|---|---|---|---|---|
| Di-3-aminopropyl ether | 15 | 111 | 660 | 45 | 12 | 61 | 41 | 92 |
|  | 30 | 194 | 610 | 76 | 13 | 65 | 43 |  |
|  | 60 | 198 | 555 | 85 | 14 | 65 | 43 |  |
|  | 120 | 180 | 525 | 83 | 12 | 65 | 42 |  |

[1] Magnitude of modulus of the vulcanization stage of 30 minutes, expressed in percent of the maximum modulus at a 300% elongation.

What is claimed is:

1. In a process which comprises the vulcanization of an unsaturated rubbery terpolymer of ethylene, an α-monoolefin of 3–8 carbon atoms, and based on the weight of the terpolymer 0.1–20% of a polyunsaturated hydrocarbon of 4–30 carbon atoms and 2–5 double bonds, the improvement comprising employing as vulcanizing ingredients, based on the weight of the copolymer, 0.25–5.0% of an accelerator selected from the group consisting of thiuram accelerators, dithiocarbamate accelerators, and mixtures thereof; 0.25–3.5% sulfur, and 0.15–5.0% of an amine selected from the group consisting of cyclohexylamine and an amine of the formula

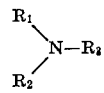

wherein $R_1$ is an alkyl, hydroxyalkyl, alkoxyalkyl or alkenyloxyalkyl residue;

$R_2$ is H, or a cycloalkyl residue; and $R_3$ is H, or an alkyl, hydroxyalkyl, alkoxyalkyl, or alkenyloxyalkyl residue.

2. A process as defined in claim 1 wherein the copolymer is comprised of 10 to 90 mol percent ethylene, 10 to 80 mol percent of an α-mono-olefin of 3–8 carbon atoms, and 0.1 to 20 percent by weight, based on the weight of the copolymer, of a polyunsaturated hydrocarbon of 4 to 30 carbon atoms and 2 to 5 double bonds.

3. A process as defined by claim 2 wherein said accelerator is tetramethyl thiuram disulfide, tetramethyl thiuram monosulfide, zinc-N-diethyl dithiocarbamate, zinc-N-dibutyl dithiocarbamate, N-cyclohexyl-ethyl-ammonium - N - cyclohexylethyl-dithiocarbamate, zinc-N-di- methyl dithiocarbamate, zinc-N-ethylphenyldithiocarbamate, zinc-N-pentamethylene dithiocarbamate, dimethyldiphenylthiuramdisulfide, or dipentamethylenethiuramtetrasulfide.

4. A process as defined by claim 2 wherein said amine is cyclohexyl amine, aminopropyl alcohol, 1-aminopropanol-2, n-butyl amine, stearyl amine, lauryl amine, 3-lauryloxy propyl amine, 3-allyloxy-2-oxypropyl amine-1, [di-(2-oxypropyl)]-ethanolamine, N-(n-butyl)-diethanolamine, cyclohexylethylamine, 3-butoxypropylamine, and (2,2'-dioxy-3,3'-diallyloxy)-dipropylamine.

5. A process as defined in claim 3 wherein said amine is cyclohexyl amine, aminopropyl alcohol, 1-aminopropanol-2, n-butyl amine, stearyl amine, lauryl amine, 3-lauryloxy propyl amine, 3-allyloxy-2-oxypropyl amine-1, [di-(2-oxypropyl)]-ethanolamine, N-(n-butyl)-diethanolamine, cyclohexylethylamine, 3-butoxypropylamine, and (2,2'-dioxy-3,3'-diallyloxy)-dipropylamine.

6. A process as defined by claim 5 wherein said α-mono-olefin is propylene, and said polyunsaturated hydrocarbon is dicyclopentadiene, hexadiene-1,4, decatriene-1,4,9, cyclooctadiene-1,5, norbornene or its alkenyl derivatives.

7. A process as defined in claim 6 wherein the content of accelerator is 1–2%, sulfur is 0.75–1.5%, and amine is 1–2%.

8. A rubber composition composed of an unsaturated rubbery terpolymer of ethylene, an α-mono-olefin of 3–8 carbon atoms and based on the weight of the terpolymer 0.1–20% of a polyunsaturated hydrocarbon of 4–30 carbon atoms and 2–5 double bonds and based on the weight of the copolymer, 0.25–5.0% of an accelerator selected from the group consisting of thiuram accelerators, dithiocarbamate accelerators, and mixtures thereof, 0.25–3.5% sulfur, and 0.15–5.0% of an amine selected from the group consisting of cyclohexylamine and an amine of the formula

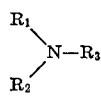

wherein $R_1$ is an alkyl, hydroxyalkyl, alkoxyalkyl or alkenyloxyalkyl residue;

$R_2$ is H, or a cycloalkyl residue; and $R_3$ is H, or an alkyl, hydroxyalkyl, alkoxyalkyl or alkenyloxyalkyl residue.

9. A rubber as defined by claim 8 wherein the copolymer is comprised of 10 to 90 mol percent ethylene, 10 to 80 percent mol of an α-mono-olefin of 3–8 carbon atoms, and 0.1 to 20 percent by weight, based on the weight of the copolymer, of a polyunsaturated hydrocarbon of 4 to 30 carbon atoms and 2 to 5 double bonds.

10. A rubber as defined by claim 9 wherein said accelerator is tetramethyl thiuram disulfide, tetramethyl thiuram monosulfide, zinc-N-diethyl dithiocarbamate, zinc-N-dibutyl dithiocarbamate, N-cyclohexyl-ethyl-ammonium - N - cyclohexylethyl-dithiocarbamate, zinc-N-dimethyl dithiocarbamate, zinc-N-ethylphenyldithiocarbamate, zinc-N-pentamethylene dithiocarbamate, dimethyldiphenylthiuramdisulfide, or dipentamethylenethiuramtetrasulfide.

11. A rubber as defined by claim 9, wherein said amine is cyclohexyl amine, aminopropyl alcohol, 1-aminopropanol-3, n-butyl amine, stearyl amine, lauryl amine, 3-lauryloxy propyl amine, 3-allyloxy-2-oxypropyl amine-1, [di-(2-oxypropyl]-ethanolamine, N-(n-butyl)-diethanolamine, cyclohexylethylamine, 3-butoxypropylamine, and (2,2′-dioxy-3,3′-diallyloxy)-dipropylamine.

12. A rubber as defined by claim 10 wherein said amine is cyclohexyl amine, aminopropyl alcohol, 1-aminopropanol-2, n-butyl amine, stearyl amine, lauryl amine, 3-lauryloxy propyl amine, 3-allyloxy-2-oxypropyl amine-1, [di-(2-oxypropyl)]-ethanolamine, N-(n-butyl)-diethanolamine, cyclohexylethylamine, 3-butoxypropylamine, and (2,2′-dioxy-3,3′-diallyloxy)-dipropylamine.

13. A rubber as defined by claim 12 wherein said α-mono-olefin is propylene, and said poly-unsaturated hydrocarbon is dicyclopentadiene, hexadiene-1,4, decatriene-1,4,9, cyclooctadiene-1,5, norbornene or its alkenyl derivatives.

14. A rubber as defined by claim 13 wherein the content of accelerator is 1–2%, sulfur is 0.75–1.5%, and amine is 1–2%.

15. A process as defined by claim 1 wherein said amine is cyclohexylethylamine.

16. A process as defined by claim 2 wherein said amine is cyclohexylethylamine.

17. A process as defined by claim 3 wherein said amine is cyclohexylethylamine.

18. A rubber as defined by claim 8 wherein said amine is cyclohexylethylamine.

19. A rubber as defined by claim 9 wherein said amine is cyclohexylethylamine.

20. A rubber as defined by claim 10 wherein said amine is cyclohexylethylamine.

21. A rubber as defined by claim 14 wherein said amine is cyclohexylethylamine.

References Cited

UNITED STATES PATENTS

| | | | |
|---|---|---|---|
| 3,211,709 | 10/1965 | Adamek et al | 260—80.78 |
| 3,345,325 | 10/1967 | Martin | 260—79.5 B |
| 1,783,216 | 12/1930 | Bogemann et al. | 260—798 |
| 2,878,232 | 3/1959 | Schweitzer, Jr. | 260—45.9 |
| 2,939,867 | 6/1960 | Ambelang | 260—79.5 |
| 3,260,708 | 7/1966 | Natta et al. | 260—79.5 |
| 3,268,493 | 8/1966 | Reynolds et al. | 260—79.5 |
| 2,223,446 | 12/1940 | Harman | 260—787 |
| 2,335,059 | 11/1943 | Harman | 260—787 |
| 2,457,335 | 12/1948 | Williams et al. | 260—27 |

JAMES A. SEIDLECK, Primary Examiner

U.S. Cl. X.R.

260—41.5 R, 798

UNITED STATES PATENT OFFICE
CERTIFICATE OF CORRECTION

Patent No. 3,654,243   Dated April 4, 1972

Inventor(s)   HARALD BLUEMEL

It is certified that error appears in the above-identified patent and that said Letters Patent are hereby corrected as shown below:

Column 3, line 16: after "percent" add --of--.

Column 8, line 22, in Table 4, under Modulus percentages:

change "65" to --85--.

Signed and sealed this 21st day of May 1974.

(SEAL)
Attest:

EDWARD M.FLETCHER, JR.
Attesting Officer

C. MARSHALL DANN
Commissioner of Patents